United States Patent
Abe et al.

(10) Patent No.: US 10,407,524 B2
(45) Date of Patent: Sep. 10, 2019

(54) COPOLYMER AND MOLDED ARTICLE

(71) Applicant: KURARAY Co., Ltd., Kurashiki-shi (JP)

(72) Inventors: Toru Abe, Tainai (JP); Atsuhiro Nakahara, Tainai (JP); Hiroshi Ozawa, Tainai (JP)

(73) Assignee: KURARAY Co., Ltd., Kurashiki-shi (JP)

( * ) Notice: Subject to any disclaimer, the term of this patent is extended or adjusted under 35 U.S.C. 154(b) by 197 days.

(21) Appl. No.: 15/502,818

(22) PCT Filed: Aug. 12, 2015

(86) PCT No.: PCT/JP2015/072846
§ 371 (c)(1),
(2) Date: Feb. 9, 2017

(87) PCT Pub. No.: WO2016/024614
PCT Pub. Date: Feb. 18, 2016

(65) Prior Publication Data
US 2017/0226249 A1    Aug. 10, 2017

(30) Foreign Application Priority Data

Aug. 12, 2014    (JP) .................................. 2014-164605

(51) Int. Cl.
*C08F 220/14*    (2006.01)
*C08J 5/18*    (2006.01)

(52) U.S. Cl.
CPC ............... *C08F 220/14* (2013.01); *C08J 5/18* (2013.01); *C08J 2333/12* (2013.01)

(58) Field of Classification Search
CPC .................................................. C08F 220/14
See application file for complete search history.

(56) References Cited

FOREIGN PATENT DOCUMENTS

| | | | |
|---|---|---|---|
| CN | 103073963 A | * | 5/2013 |
| CN | 103073963 A | | 5/2013 |
| EP | 1 479 746 A2 | | 11/2004 |
| JP | 59-41349 A | | 3/1984 |
| JP | 59-179608 A | | 10/1984 |
| JP | 59-179612 A | | 10/1984 |
| JP | 61-141759 A | | 6/1986 |
| JP | 8-170036 A | | 7/1996 |
| JP | 9-169882 A | | 6/1997 |
| JP | 9-302191 A | | 11/1997 |
| JP | 10-77308 A | | 3/1998 |
| JP | 10-114848 A | | 5/1998 |
| JP | 2003-137915 A | | 5/2003 |

OTHER PUBLICATIONS

Machine translation of CN 103073963. (Year: 2013).*
Supplementary European Search Report dated Dec. 7, 2017 in European Patent Application No. 15 83 2518, 6 pages.
International Search Report dated Nov. 17, 2015 in PCT/JP2015/072846 filed Aug. 12, 2015.

* cited by examiner

*Primary Examiner* — Wenwen Cai
(74) *Attorney, Agent, or Firm* — Oblon, McClelland, Maier & Neustadt, L.L.P.

(57) ABSTRACT

A copolymer comprising a structural unit (I) derived from a phosphonate monomer (1) such as diethyl methacryloyloxymethyl phosphonate and diethyl 2-methacryloyloxyethyl phosphonate, a structural unit (II) derived from a radical polymerizable monomer (2) such as methacrylic acid, acrylic acid, 8-tricyclo[5.2.1.0$^{2,6}$]decanyl methacrylate, and t-butyl methacrylate, and a structural unit (III) derived from methyl methacrylate, the content of phosphorus atoms derived from the phosphonate monomer (1) being not less than 1.0% by mass and less than 2.0% by mass relative to the mass of the copolymer, and a formed article comprising the copolymer.

19 Claims, No Drawings

COPOLYMER AND MOLDED ARTICLE

TECHNICAL FIELD

The present invention relates to a copolymer having excellent transparency, excellent flame resistance and a high glass transition temperature, and a formed article comprising the copolymer.

BACKGROUND ART

Resins with excellent transparency are used in applications such as optical materials, lighting materials, signboards, decorative members and the like. In these applications, the resins are sometimes required to be flame resistance.

As a method for increasing flame resistance of a resin, addition of an inorganic compound such as basic magnesium carbonate to the resin to obtain a resin composition is known (see Patent Document 1, for example). However, this resin composition usually has low transparency and is therefore unsuitable for applications where excellent transparency is required, such as for optical materials and the like.

As another method for increasing the flame resistance, addition of a phosphoric acid ester or a halogen-containing condensed phosphoric acid ester to obtain a resin composition is known (see Patent Documents 2, 3, and 4, for example). However, the phosphoric acid ester or the halogen-containing condensed phosphoric acid ester may bleed out to the surface of this resin composition over time, leading to surface whitening and low flame resistance. Upon burning, a resin composition comprising a halogen-containing condensed phosphoric acid ester, in particular, may generate halogen gas, which is toxic and causes metal corrosion.

Also suggested is a copolymer of a phosphonate monomer or a phosphate monomer with a (meth)acrylic acid alkyl ester (see Patent Documents 5 and 6 and Non-patent Documents 1 and 2). In order to increase flame resistance of this copolymer, however, the proportion of the phosphonate monomer or the phosphate monomer that undergoes copolymerization needs to be high, resulting in a low glass transition temperature of the resulting copolymer. Therefore, this copolymer is unsuitable for applications under high temperatures.

CITATION LIST

Patent Literatures

Patent Document 1: JP S61-141759 A
Patent Document 2: JP S59-41349 A
Patent Document 3: JP H09-302191 A
Patent Document 4: JP H09-169882 A
Patent Document 5: JP H10-77308 A
Patent Document 6: JP 2003-137915 A

Non-Patent Literatures

Non-Patent Document 1: Polymer Degradation and Stability, Vol. 70, 2000, p 425-436.
Non-Patent Document 2: Polymer Degradation and Stability, Vol. 74, 2001, p 441-447.
Non-Patent Document 3: Journal of Polymer Science: Part A: Polymer Chemistry, 1988, Vol. 26, p 1791-1807.
Non-Patent Document 4: Polymer Degradation and Stability, 2002, Vol. 77, p 227-233.
Non-Patent Document 5: Journal of Polymer Science Part A: Polymer Chemistry, 2011, Vol. 49, 2008-2017

SUMMARY OF THE INVENTION

Problems to be Solved by the Invention

An object of the present invention is to provide low-cost production of a copolymer having excellent transparency, excellent flame resistance, and a high glass transition temperature.

Means for Solving the Problems

Studies have been conducted to achieve the object. As a result, the present invention has now been completed including the following aspects.

[1] A copolymer comprising:

a structural unit (I) derived from a phosphonate monomer represented by Formula (1);

a structural unit (II) derived from at least one radical polymerizable monomer (2) selected from the group consisting of methacrylic acid, acrylic acid, a radical polymerizable monomer represented by Formula (2a), and a radical polymerizable monomer represented by Formula (2b); and a structural unit (III) derived from methyl methacrylate; and a content of phosphorus atoms derived from the phosphonate monomer represented by Formula (1) being not less than 1.0% by mass and less than 2.0% by mass relative to a mass of the copolymer.

[Chem. 1]

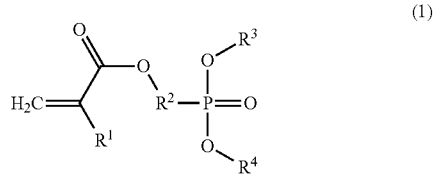

(1)

(in Formula (1), $R^1$ represents hydrogen atom or methyl group, $R^2$ represents an alkylene group having 1 to 4 of carbon atoms, and $R^3$ and $R^4$ each independently represent hydrogen atom or an alkyl group having 1 to 10 of carbon atoms.)

[Chem. 2]

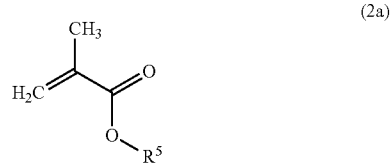

(2a)

(in Formula (2a), $R^5$ represents a polycyclic aliphatic hydrocarbon group or an alkyl-substituted monocyclic aliphatic hydrocarbon group.)

[Chem. 3]

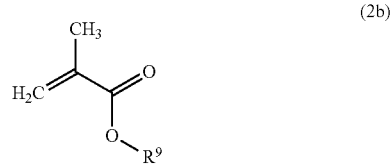

(2b)

(in Formula (2b), $R^9$ represents —$CH_2CHR^{10}R^{11}$, —$CHR^{10}$—$CHR^{11}R^{12}$, or —$CR^{10}R^{11}R^{13}$; $R^{10}$, $R^{11}$ and $R^{13}$ each independently represent an alkyl group having 1 to 3 of carbon atoms, and $R^{12}$ represents hydrogen atom or an alkyl group having 1 to 3 of carbon atoms.)

[2] The copolymer according to the aspect [1], wherein the structural unit (II) contains at least a structural unit derived from methacrylic acid or acrylic acid, a total content of the structural unit derived from methacrylic acid or acrylic acid is 1 to 12% by mass relative to the mass of the copolymer.

[3] The copolymer according to the aspect [1] or [2], wherein a content of the structural unit (III) is not less than 50% by mass and not more than 80% by mass relative to the mass of the copolymer.

[4] The copolymer according to any one of the aspects [1] to [3], wherein a content of the structural unit (II) is not less than 5% by mass and not more than 30% by mass relative to the mass of the copolymer.

[5] The copolymer according to any one of the aspects [1] to [4], wherein
the structural unit (II) comprises at least a structural unit derived from the radical polymerizable monomer represented by Formula (2a),
$R^5$ in Formula (2a) is norbornyl group, isobornyl group, tricyclodecanyl group, dicyclopentadienyl group, adamantyl group, or 4-t-butylcyclohexyl group.

[6] The copolymer according to any one of the aspects [1] to [5], wherein a glass transition temperature of the copolymer is not less than 115° C.

[7] The copolymer according to any one of the aspects [1] to [6], wherein a weight average molecular weight of the copolymer is not less than 150 thousand.

[8] A formed article comprising the copolymer as described in any one of the aspects [1] to [7].

[9] The formed article according to the aspect [8] having a thickness of not less than 2 mm.

Advantageous Effects of the Invention

A copolymer and a formed article of the present invention have excellent transparency, excellent flame resistance, and high glass transition temperature and therefore can be used in applications where heat resistance is required.

EMBODIMENTS FOR CARRYING OUT THE INVENTION

A copolymer of the present invention comprises a structural unit (I), a structural unit (II), and a structural unit (III).

The structural unit (I) is derived from a phosphonate monomer represented by Formula (1) (hereinafter, also called "phosphonate monomer (1)").

$R^1$ in Formula (1) represents hydrogen atom or methyl group.

$R^2$ in Formula (1) represents an alkylene group having 1 to 4 of carbon atoms. The alkylene group is a divalent hydrocarbon group. Examples of the alkylene group can include methylene group, ethylene group (also known as dimethylene group), trimethylene group, propylene group (also known as propane-1,2-diyl group), tetramethylene group, butane-1,2-diyl group, butane-1,3-diyl group, and the like. Among these, methylene group and ethylene group are preferable from the economical viewpoint.

$R^3$ and $R^4$ in Formula (1) each independently represent hydrogen atom or an alkyl group having 1 to 10 of carbon atoms. Examples of the alkyl group can include methyl group, ethyl group, n-propyl group, i-propyl group, n-butyl group, i-butyl group, s-butyl group, t-butyl group, n-pentyl group, i-pentyl group, neopentyl group, 2-methylbutyl group, 2,2-dimethylpropyl group, n-hexyl group, i-hexyl group, heptyl group, octyl group, nonyl group, decyl group, and the like.

Specific examples of the phosphonate monomer (1) can include diethyl methacryloyloxymethyl phosphonate, diethyl 2-methacryloyloxyethyl phosphonate, diethyl 1-methacryloyloxyethyl phosphonate, dimethyl 3-methacryloyloxypropyl phosphonate, dimethyl 2-methacryloyloxypropyl phosphonate, dimethyl 4-methacryloyloxybutyl phosphonate, dimethyl 3-methacryloyloxybutyl phosphonate, dimethyl 2-methacryloyloxybutyl phosphonate; diethyl acryloyloxymethyl phosphonate, diethyl 2-acryloyloxyethyl phosphonate, dimethyl 3-acryloyloxypropyl phosphonate, dimethyl 2-acryloyloxypropyl phosphonate, dimethyl 4-acryloyloxybutyl phosphonate, dimethyl 3-acryloyloxybutyl phosphonate, dimethyl 2-acryloyloxybutyl phosphonate; and the like. Among these, diethyl methacryloyloxymethyl phosphonate and diethyl 2-methacryloyloxyethyl phosphonate are preferable from the viewpoint of increasing the flame resistance of the copolymer. As the phosphonate monomer (1), these compounds may be used alone or in combination of 2 or more.

From the viewpoint of simultaneously obtaining flame resistance and heat resistance, the content of the structural unit (I) in the copolymer of the present invention is preferably not less than 3.6 mol % and less than 15 mol %, more preferably not less than 4.0 mol % and not more than 10 mol %, relative to the total mole of the structural units in the copolymer. As the content of the structural unit (I) increases, the flame resistance of the copolymer tends to increase, while as the content of the structural unit (I) decreases, the glass transition temperature of the copolymer tends to increase. Meanwhile, when the phosphonate monomers (1) are used in combination of two or more, the above-described content of the structural unit (I) derived from the phosphonate monomer (1) refers to the total content of the structural units derived from the two or more phosphonate monomers (1).

In the copolymer of the present invention, the content of phosphorus atoms derived from the phosphonate monomer (1) is preferably not less than 1.0% by mass and less than 2.0% by mass, more preferably not less than 1.20% by mass and not more than 1.98% by mass, relative to the mass of the copolymer.

The structural unit (II) is derived from at least one radical polymerizable monomer (2) selected from the group consisting of methacrylic acid, acrylic acid, a radical polymerizable monomer represented by Formula (2a) (hereinafter, also called "radical polymerizable monomer (2a)"), and a radical polymerizable monomer represented by Formula (2b) (hereinafter, also called "radical polymerizable monomer (2b)").

$R^5$ in Formula (2a) represents a polycyclic aliphatic hydrocarbon group or an alkyl-substituted monocyclic aliphatic hydrocarbon group. The alkyl group in the alkyl-substituted monocyclic aliphatic hydrocarbon group is preferably an alkyl group having 1 to 4 of carbon atoms, such as methyl group, isopropyl group, t-butyl group or the like.

Examples of the polycyclic aliphatic hydrocarbon group can include norbornyl group, isobornyl group, tricyclodecanyl group, dicyclopentadienyl group, adamantyl group, fenchyl group, decalin group, and the like. Among these, norbornyl group, isobornyl group, tricyclodecanyl group, dicyclopentadienyl group, and adamantyl group are preferable.

Examples of the alkyl-substituted monocyclic aliphatic hydrocarbon group can include 4-methylcyclohexyl group, 2-methylcyclohexyl group, 4-isopropylcyclohexyl group, 2-isopropylcyclohexyl group, 4-t-butylcyclohexyl group, 2-t-butylcyclohexyl group, and the like. Among these, 4-t-butylcyclohexyl group is preferable.

Specific examples of the radical polymerizable monomer (2a) can include alkyl-substituted monocyclic aliphatic hydrocarbon methacrylic acid esters such as 4-methylcyclohexyl methacrylate, 2-methylcyclohexyl methacrylate, 4-isopropylcyclohexyl methacrylate, 2-isopropylcyclohexyl methacrylate, 4-t-butylcyclohexyl methacrylate, 2-t-butylcyclohexyl methacrylate and the like; polycyclic aliphatic hydrocarbon methacrylic acid esters such as 2-norbornyl methacrylate, 2-methyl-2-norbornyl methacrylate, 2-ethyl-2-norbornyl methacrylate, 2-isobornyl methacrylate, 2-methyl-2-isobornyl methacrylate, 2-ethyl-2-isobornyl methacrylate, 8-tricyclo[5.2.1.0$^{2,6}$]decanyl methacrylate, 8-methyl-8-tricyclo[5.2.1.0$^{2,6}$]decanyl methacrylate, 8-ethyl-8-tricyclo[5.2.1.0$^{2,6}$]decanyl methacrylate, 2-adamantyl methacrylate, 2-methyl-2-adamantyl methacrylate, 2-ethyl-2-adamantyl methacrylate, 1-adamantyl methacrylate, 2-fenchyl methacrylate, 2-methyl-2-fenchyl methacrylate, 2-ethyl-2-fenchyl methacrylate, decalin-1-yl methacrylate, decalin-2-yl methacrylate; and the like. Among these, 2-norbornyl methacrylate, 2-isobornyl methacrylate, 8-tricyclo[5.2.1.0$^{2,6}$]decanyl methacrylate, 8-tricyclo[5.2.1.0$^{2,6}$]deca-3,8-dienyl methacrylate, 2-adamantyl methacrylate, 1-adamantyl methacrylate, and 4-t-butylcyclohexyl methacrylate are preferable. From the viewpoint of availability, 2-isobornyl methacrylate or 8-tricyclo[5.2.1.0$^{2,6}$]decanyl methacrylate is more preferable.

In Formula (2b), $R^9$ represents —$CH_2CHR^{10}R^{11}$, —$CHR^{10}$—$CHR^{11}R^{12}$, or —$CR^{10}R^{11}R^{13}$; $R^{10}$, $R^{11}$ and $R^{13}$ each independently represent an alkyl group having 1 to 3 of carbon atoms; and $R^{12}$ represents hydrogen atom or an alkyl group having 1 to 3 carbon atoms. Examples of the alkyl group can include methyl group, ethyl group, n-propyl group, isopropyl group, and the like.

Specific examples of the radical polymerizable monomer (2b) can include isobutyl methacrylate, s-butyl methacrylate, t-butyl methacrylate, 1-methylbutyl methacrylate, 2-methylbutyl methacrylate, 1,1-dimethylpropyl methacrylate, 1,3-dimethylbutyl methacrylate, 2-ethylbutyl methacrylate, 2-methylpentyl methacrylate, and the like. Among these, isobutyl methacrylate, s-butyl methacrylate, and t-butyl methacrylate are preferable, and t-butyl methacrylate is more preferable from the viewpoints of availability and high heat resistance.

The radical polymerizable monomer (2) may be used alone or in combination of two or more.

The radical polymerizable monomer (2a) or (2b) is preferably a monomer that upon burning, readily undergoes ester bond breakage and is converted into methacrylic acid or acrylic acid. Methacrylic acid or acrylic acid tends to increase water absorbability of the copolymer slightly and also tends to increase heat resistance of the copolymer. The radical polymerizable monomer (2a) tends to decrease water absorbability of the copolymer. The radical polymerizable monomer (2a) tends to increase the glass transition temperature of the copolymer, while the radical polymerizable monomer (2b) tends to decrease the glass transition temperature of the copolymer. A combined use of methacrylic acid or acrylic acid and the radical polymerizable monomer (2a) is preferable because the resulting copolymer tends to have low water absorbability and high heat resistance.

In the amount of the structural unit (II) comprised in the copolymer of the present invention, a lower limit is preferably 1% by mass, more preferably 5% by mass, further preferably 10% by mass, particularly preferably 15% by mass, relative to the mass of the copolymer and an upper limit is preferably 50% by mass, more preferably 40% by mass, further preferably 30% by mass, relative to the mass of the copolymer. As the content of the structural unit (II) increases, the glass transition temperature of the copolymer tends to increase. Meanwhile, when the radical polymerizable monomers (2) are used in combination of two or more, the above-described content of the structural unit (II) refers to the total content of the structural units derived from the two or more radically polymerizable monomers (2).

In a preferable aspect of the present invention, the structural unit (II) of the copolymer comprises at least a structural unit derived from methacrylic acid or acrylic acid. The total content of the structural unit derived from methacrylic acid or acrylic acid in the copolymer is preferably 1 to 12% by mass, more preferably 2 to 8% by mass, relative to the mass of the copolymer.

In another preferable aspect of the present invention, the structural unit (II) of the copolymer comprises at least a structural unit derived from the radical polymerizable monomer represented by Formula (2a). As for this copolymer, $R^5$ in Formula (2a) is preferably norbornyl group, isobornyl group, tricyclodecanyl group, dicyclopentadienyl group, adamantyl group, or 4-t-butylcyclohexyl group.

The structural unit (III) in the copolymer of the present invention is derived from methyl methacrylate.

From the viewpoint of transparency, the lower limit of the structural unit (III) comprised in the copolymer of the present invention is preferably 50% by mass, more preferably 55% by mass, further preferably 58% by mass, most preferably 60% by mass, relative to the mass of the copolymer. From the viewpoint of flame resistance, the upper limit of the structural unit (III) comprised in the copolymer of the present invention is preferably 80% by mass, more preferably 75% by mass, further preferably 72% by mass, most preferably 70% by mass, relative to the mass of the copolymer.

The copolymer of the present invention may further comprise a structural unit (IV) derived from an additional radical polymerizable monomer (hereinafter, called "radical polymerizable monomer (4)"), in addition to the structural unit derived from the phosphonate monomer (1), the radical polymerizable monomer (2), or methyl methacrylate. Examples of the radical polymerizable monomer (4) can include vinyl aromatic hydrocarbons such as styrene, α-methylstyrene, p-methylstyrene, m-methylstyrene or the like; vinyl alicyclic hydrocarbons such as vinylcyclohexane, vinylcyclopentane, vinylcyclohexene, vinylcycloheptane, vinylcycloheptene, vinylnorbornene or the like; ethylenically unsaturated dicarboxylic acids such as maleic anhydride, maleic acid, itaconic acid or the like; olefins such as ethylene, propylene, 1-butene, isobutylene, 1-octene or the like; conjugated dienes such as butadiene, isoprene, myrcene or the like; acrylamide, methacrylamide, acrylonitrile, methacrylonitrile, vinyl acetate, vinyl ketone, vinyl chloride, vinylidene chloride, vinylidene fluoride; acrylic acid alkyl esters such as methyl acrylate, ethyl acrylate, n-propyl acrylate, isopropyl acrylate, n-butyl acrylate, isobutyl acrylate, s-butyl acrylate, t-butyl acrylate, amyl acrylate, isoamyl acrylate, n-hexyl acrylate, 2-ethylhexyl acrylate, pentadecyl acrylate, dodecyl acrylate or the like; 2-hydroxyethyl acrylate, 2-ethoxyethyl acrylate, glycidyl acrylate, allyl acrylate; methacrylic acid alkyl esters wherein the alkyl group having not less than two of carbon atoms, such as ethyl methacrylate, n-propyl methacrylate, isopropyl methacrylate, n-butyl methacrylate, amyl methacrylate, isoamyl methacrylate, n-hexyl methacrylate, 2-ethylhexyl methacrylate, pentadecyl methacrylate, dodecyl methacrylate or the like; 2-hydroxyethyl methacrylate, 2-ethoxyethyl methacrylate, glycidyl methacrylate, allyl methacrylate; unsubstituted monocyclic aliphatic hydrocarbon (meth)acrylic acid esters such as cyclohexyl (meth)acrylate, cyclopentyl (meth)acrylate, cycloheptyl (meth)acrylate or the like;

(meth)acrylic acid aryl esters such as phenyl methacrylate, phenyl acrylate or the like; (meth)acrylic acid aralkyl esters such as benzyl (meth)acrylate, phenoxyethyl (meth) acrylate or the like; ethylenically unsaturated heterocyclic compounds such as 2-vinylfuran, 2-isopropenylfuran, 2-vinylbenzofuran, 2-isopropenylbenzofuran, 2-vinyldibenzofuran, 2-vinylthiophene, 2-isopropenylthiophene, 2-vinyldibenzothiophene, 2-vinylpyrrole, N-vinylindole, N-vinylcarbazole, 2-vinyloxazole, 2-isopropenyloxazole, 2-vinylbenzoxazole, 3-vinylisoxazole, 3-isopropenylisoxazole, 2-vinylthiazole, 2-vinylimidazole, 4(5)-vinylimidazole, N-vinylimidazole, N-vinylimidazoline, 2-vinylbenzimidazole, 5(6)-vinylbenzimidazole, 5-isopropenylpyrazole, 2-isopropenyl 1,3,4-oxadiazole, vinyltetrazole, 2-vinylpyridine, 4-vinylpyridine, 2-isopropenylpyridine, 3-vinylpyridine, 3-isopropenylpyridine, 2-vinylquinoline, 2-isopropenylquinoline, 4-vinylquinoline, 4-vinylpyrimidine, 2,4-dimethyl-6-vinyl-S-triazine, 3-methylidenedihydrofuran-2(3H)-one, 4-methyl-3-methylidenedihydrofuran-2(3H)-one, 4-decyl-3-methylidenedihydrofuran-2(3H)-one or the like; phosphoric acid esters having an ethylenically unsaturated group, such as dimethyl methacryloyloxymethyl phosphate, 2-methacryloyloxy-1-methylethyl phosphate or the like; 5-methyl-3-methylidenedihydrofuran-2(3H)-one, 4,5-dimethyl-3-methylidenedihydrofuran-2(3H)-one, 5,5-dimethyl-3-methylidenedihydrofuran-2(3H)-one, 5-ethyl-3-methylidenedihydrofuran-2(3H)-one, 5-decyl-3-methylidenedihydrofuran-2(3H)-one; and the like. Among these, a methacrylic acid alkyl ester and an acrylic acid alkyl ester are preferable, and methyl methacrylate and methyl acrylate are more preferable. The radical polymerizable monomer (4) may be used alone or in combination of two or more. Herein, the term "(meth)acrylic" or "(meth)acrylate" refers to "methacrylic or acrylic" or "methacrylate or acrylate", respectively.

In view of a good balance between heat resistance and flame resistance, the content of the structural unit (IV) in the copolymer of the present invention is preferably not more than 15% by mass, more preferably not more than 10% by mass, further preferably not more than 5% by mass, relative to the mass of the copolymer. Meanwhile, when the radical polymerizable monomers (4) are used in combination of two or more, the above-described content of the structural unit (IV) refers to the total content of the structural units derived from the two or more radical polymerizable monomer (4).

The structural unit (IV) in the copolymer of the present invention may contain a structural unit (IV-1) derived from a polyfunctional polymerizable monomer. Examples of the polyfunctional polymerizable monomer can include polyfunctional (meth)acrylates such as allyl (meth)acrylate, ethylene glycol di(meth)acrylate, diethylene glycol di(meth) acrylate, triethylene glycol di(meth)acrylate, polyethylene glycol di(meth)acrylate, 1,2-propylene glycol di(meth)acrylate, 1,3-butylene glycol di(meth)acrylate, 1,6-hexanediol di(meth)acrylate, neopentyl glycol di(meth)acrylate, tricyclodecane dimethanol di(meth)acrylate, trimethylolpropane tri(meth)acrylate, tetramethylolmethane tri(meth)acrylate, tetramethylolmethane tetra(meth)acrylate or the like; polyfunctional vinyl aromatic compounds such as m-divinylbenzene, p-divinylbenzene, 1,2-diisopropylbenzene, 1,3-diisopropenylbenzene, 1,4-diisopropenylbenzene, 1,3-divinylnaphthalene, 1,8-divinylnaphthalene, 1,4-divinylnaphthalene, 1,5-divinylnaphthalene, 2,3-divinylnaphthalene, 2,7-divinylnaphthalene, 2,6-divinylnaphthalene, 4,4'-divinylbiphenyl, 4,3'-divinylbiphenyl, 4,2'-divinylbiphenyl, 3,2'-divinylbiphenyl, 3,3'-divinylbiphenyl, 2,2'-divinylbiphenyl, 2,4-divinylbiphenyl, 1,2-divinyl-3,4-dimethylbenzene, 1,3-divinyl-4,5,8-tributylnaphthalene, 2,2'-divinyl-4-ethyl-4'-propylbiphenyl, 1,2,4-trivinylbenzene, 1,3,5-trivinylbenzene, 1,2,4-triisopropenylbenzene, 1,3,5-triisopropenylbenzene, 1,3,5-trivinylnaphthalene, 3,5,4'-trivinylbiphenyl; and the like. Among these, ethylene glycol di(meth)acrylate and diethylene glycol di(meth)acrylate are preferable. The polyfunctional polymerizable monomer may be used alone or in combination of two or more. Herein, the term "(meth)acrylate" refers to "methacrylate or acrylate".

In view of a good balance between heat resistance and flame resistance, the content of the structural unit (IV-1) in the copolymer of the present invention is preferably not less than 0.001% by mass and not more than 10% by mass, more preferably not less than 0.01% by mass and not more than 5% by mass, further preferably not less than 0.1% by mass and not more than 1% by mass, relative to the mass of the copolymer. Meanwhile, when the polyfunctional polymerizable monomers are used in combination of two or more, the above-described content of the structural unit (IV-1) refers to the total content of the structural units derived from the two or more polyfunctional polymerizable monomers.

The content of each structural unit in the copolymer of the present invention can be determined by $^1$H-NMR analysis. When it is difficult to determine by $^1$H-NMR analysis for a reason such as overlapping peaks, pyrolysis gas chromatography can be employed alternatively.

Specific examples of the copolymer can include methyl methacrylate/methacrylic acid/diethyl methacryloyloxymethyl phosphonate copolymer, methyl methacrylate/methacrylic acid/diethyl 2-methacryloyloxyethyl phosphonate copolymer, methyl methacrylate/acrylic acid/diethyl methacryloyloxymethyl phosphonate copolymer, methyl methacrylate/acrylic acid/diethyl 2-methacryloyloxyethyl phosphonate copolymer, methyl methacrylate/8-tricyclo [5.2.1.0$^{2,6}$]decanyl methacrylate/diethyl methacryloyloxymethyl phosphonate copolymer, methyl methacrylate/8-tricyclo[5.2.1.0$^{2,6}$]decanyl methacrylate/diethyl 2-methacryloyloxyethyl phosphonate copolymer, methyl methacrylate/2-isobornyl methacrylate/diethyl methacryloyloxymethyl phosphonate copolymer, methyl methacrylate/2-isobornyl methacrylate/diethyl 2-methacryloyloxyethyl phosphonate copolymer, methyl methacrylate/t-butyl methacrylate/diethyl methacryloyloxymethyl phosphonate copolymer, methyl methacrylate/t-butyl methacrylate/diethyl 2-methacryloyloxyethyl phosphonate copolymer, methyl methacrylate/8-tricyclo[5.2.1.0$^{2,6}$]decanyl methacrylate/diethyl methacryloyloxymethyl phosphonate/methyl acrylate copolymer, methyl methacrylate/8-tricyclo[5.2.1.0$^{2,6}$]decanyl methacrylate/diethyl 2-methacryloyloxyethyl phosphonate/methyl acrylate copolymer, methyl methacrylate/2-isobornyl methacrylate/diethyl methacryloyloxymethyl phosphonate/methyl acrylate copolymer, methyl methacrylate/2-isobornyl methacrylate/diethyl 2-methacryloyloxyethyl phosphonate/methyl acrylate copolymer, methyl methacrylate/t-butyl methacrylate/diethyl methacryloyloxymethyl phosphonate/methyl acrylate copolymer, methyl methacrylate/t-butyl methacrylate/diethyl 2-methacryloyloxyethyl phosphonate/methyl acrylate copolymer, methyl methacrylate/8-tricyclo[5.2.1.0$^{2,6}$]decanyl methacrylate/methacrylic acid/diethyl methacryloyloxymethyl phosphonate copolymer, methyl methacrylate/8-tricyclo[5.2.1.0$^{2,6}$]decanyl methacrylate/methacrylic acid/diethyl 2-methacryloyloxyethyl phosphonate copolymer, methyl methacrylate/2-isobornyl methacrylate/methacrylic acid/diethyl methacryloyloxymethyl phosphonate copolymer, methyl methacrylate/2-isobornyl methacrylate/methacrylic acid/diethyl 2-methacryloyloxyethyl phosphonate copolymer, methyl methacrylate/t-butyl methacrylate/methacrylic acid/diethyl methacryloyloxymethyl phosphonate copolymer, methyl methacrylate/t-butyl methacrylate/methacrylic acid/diethyl 2-methacryloyloxyethyl phosphonate copolymer, methyl methacrylate/8-tricyclo[5.2.1.0$^{2,6}$]decanyl methacrylate/methacrylic acid/diethyl methacryloyloxymethyl phosphonate/methyl acrylate copolymer, methyl methacrylate/8-tricyclo[5.2.1.0$^{2,6}$]decanyl methacrylate/methacrylic acid/diethyl 2-methacryloyloxyethyl phosphonate/methyl acrylate copolymer, methyl methacrylate/2-isobornyl methacrylate/methacrylic acid/diethyl methacryloyloxymethyl phosphonate/methyl acrylate copolymer, methyl methacrylate/2-isobornyl methacrylate/methacrylic acid/diethyl 2-methacryloyloxyethyl phosphonate/methyl acrylate copolymer, methyl methacrylate/t-butyl methacrylate/methacrylic acid/diethyl methacryloyloxymethyl phosphonate/methyl acrylate copolymer, methyl methacrylate/t-butyl methacrylate/methacrylic acid/diethyl 2-methacryloyloxyethyl phosphonate/methyl acrylate copolymer, and the like.

The glass transition temperature of the copolymer of the present invention is preferably 110° C. to 180° C., more preferably 120° C. to 165° C. When the glass transition temperature is excessively low, the copolymer has insufficient heat resistance, while when the glass transition temperature is excessively high, the copolymer is brittle. The glass transition temperature is measured in accordance with JIS K7121. More specifically, a DSC curve is obtained by differential scanning calorimetry under conditions where the temperature of the copolymer of the present invention is raised to reach 230° C., then cooled to room temperature, and raised again from room temperature to 230° C. at 10° C./minute. From the DSC curve obtained while the temperature is being raised the second time, the midpoint glass transition temperature is determined, for use as the glass transition temperature of the present invention.

The weight average molecular weight of the copolymer of the present invention has a lower limit thereto of preferably 100 thousand, more preferably 150 thousand, further preferably 300 thousand. The upper limit to the weight average molecular weight is not particularly limited but is preferably five million, more preferably three million, from the viewpoint of formability. With the weight average molecular weight within the range, the copolymer is excellent in impact resistance and toughness, for example.

The copolymer of the present invention has a ratio of weight average molecular weight to number average molecular weight (hereinafter, also called "molecular weight distribution") of preferably 1.1 to 10.0, more preferably 1.5 to 5.0, particularly preferably 1.6 to 3.0. With the molecular weight distribution within the range, the copolymer is excellent in formability and the formed article obtained from the copolymer is excellent in impact resistance and toughness, for example.

The weight average molecular weight and the molecular weight distribution are determined by GPC (gel permeation chromatography) in terms of standard polystyrene.

The weight average molecular weight and the molecular weight distribution can be modified by selecting the kinds, and the contents of a polymerization initiator and a chain transfer agent, and other conditions.

The copolymer of the present invention can be obtained by copolymerizing the phosphonate monomer (1), the radical polymerizable monomer (2), and methyl methacrylate, and if needed the radical polymerizable monomer (4) in a proportion corresponding to the above-described content of each structural unit. The method of copolymerization is not particularly limited, and examples thereof can include emulsion polymerization method, suspension polymerization method, bulk polymerization method, solution polymerization method, or the like. Preferably, a reaction forming method such as cell-cast polymerization method is employed in which the extent of heat that the copolymer being formed receives can be reduced and consequently the resulting formed article can have a low yellow index. Copolymerization can be initiated at a predetermined temperature in the presence of the polymerization initiator. The chain transfer agent can be used, if needed, to adjust the weight average molecular weight or the like of the resulting copolymer.

Each of the raw materials for the copolymer of the present invention, namely, the phosphonate monomer (1), the radical polymerizable monomer (2), and methyl methacrylate, and if needed the radical polymerizable monomer (4), has a yellow index of preferably not more than 2, more preferably not more than 1, measured at an optical path length of 3.2 mm. When the yellow index is low enough, discoloration of the resulting copolymer can be suppressed. For example, the resulting copolymer in the form of a 3.2-mm-thick test piece can have a yellow index of not more than 2.0.

The yellow index is determined by measurement in accordance with JIS Z8722 and subsequent calculation in accordance with JIS K7373.

The polymerization initiator used in producing the copolymer of the present invention is not particularly limited provided that it generates reactive radicals. Examples of the polymerization initiator can include organic peroxides such as t-hexylperoxy isopropyl monocarbonate, t-hexylperoxy 2-ethylhexanoate, 1,1,3,3-tetramethylbutylperoxy 2-ethylhexanoate, t-butylperoxy pivalate, t-hexylperoxy pivalate, t-butylperoxy neodecanoate, t-hexylperoxy neodecanoate, 1,1,3,3-tetramethylbutylperoxy neodecanoate, 1,1-bis(t-hexylperoxy)cyclohexane, benzoyl peroxide, 3,5,5-trimethylhexanoyl peroxide, lauroyl peroxide or the like; azo compounds such as 2,2'-azobis(2-methylpropionitrile), 2,2'-azobis(2-methylbutyronitrile), dimethyl 2,2'-azobis(2-methylpropionate) or the like; persulfates such as ammonium persulfate, potassium persulfate, sodium persulfate; and the like. Among these, azo compounds are preferable. The polymerization initiators may be used alone or in combination of two or more. The amount of the polymerization initiator to be added and the method for adding the polymerization initiator, for example, are not particularly limited and can be selected appropriately in accordance with the purpose of the addition. For example, the amount of the polymerization initiator is preferably within the range of 0.0001 part by mass to 0.2 part by mass, more preferably within the range of 0.001 part by mass to 0.1 part by mass, relative to 100 parts by mass of the total amount of the monomers. Meanwhile, when the polymerization initiators are used in combination of two or more, the above-described amount of the polymerization initiator refers to the total amount of the two or more polymerization initiators.

Examples of the chain transfer agent used in producing the copolymer of the present invention can include alkylmercaptans such as n-octyl mercaptan, n-dodecyl mercaptan, t-dodecyl mercaptan, 1,4-butanedithiol, 1,6-hexanedithiol, ethylene glycol bisthiopropionate, butanediol bisthioglycolate, butanediol bisthiopropionate, hexanediol bisthioglycolate, hexanediol bisthiopropionate, trimethylolpropane tris-(β-thiopropionate), pentaerythritol tetrakisthiopropionate or the like; α-methylstyrene dimer; terpinolene; and the like. Among these, monofunctional alkylmercaptans such as n-octyl mercaptan and n-dodecyl mercaptan are preferable. The chain transfer agents may be used alone or in combination of two or more. The amount of the chain transfer agent to be used is preferably 0.01 part by mass to 1 part by mass, more preferably 0.02 part by mass to 0.8 part by mass, further preferably 0.03 part by mass to 0.6 part by mass, relative to 100 parts by mass of the total amount of the monomers. Meanwhile, when the chain transfer agents are used in combination of two or more, the above-described amount of the chain transfer agent refers to the total amount of the two or more chain transfer agents.

Copolymerization of the phosphonate monomer (1), the radical polymerizable monomer (2), and methyl methacrylate, and the radical polymerizable monomer (4) as an optional component may be conducted by feeding a mixture of all the components necessary for copolymer production into a reactor or may be conducted by feeding the components necessary for copolymer production separately into a reactor. Preferable is feeding a mixture of all the components necessary for copolymer production into a reactor. This mixing is preferably conducted in an atmosphere of inert gas such as nitrogen gas or the like.

The temperature during copolymerization is preferably 0° C. to 200° C., more preferably 20° C. to 180° C. The duration of copolymerization is selected depending on the reaction scale, and from the economical viewpoint, it is preferably 0.1 hour to 20 hours, more preferably 0.5 hour to 10 hours. Copolymerization is preferably conducted in an atmosphere of inert gas such as nitrogen gas or the like.

After the completion of copolymerization, an unreacted monomer and solvent can be removed by a known method. For ease of forming, the copolymer may be made into a form such as the powder, grain form, pellet form or the like by a known method.

In the present invention, various additives may be added to the copolymer if needed. Examples of the additives can include an antioxidant, a thermal degradation inhibitor, an ultraviolet absorber, a light stabilizer, a lubricant, a mold release agent, a polymer processing aid, an impact resistance modifier, an organic coloring agent, a light dispersing agent, a delustering agent, a fluorescent substance, an antistatic agent, a flame retardant, a plasticizer, an inorganic filler, a fiber, and the like. The amount of each of the various additives to be added can be selected appropriately provided that the effects of the present invention are not impaired. The amount of each additive to be added is preferably 0.001 part by mass to 5 parts by mass, more preferably 0.01 part by mass to 1 part by mass, relative to 100 parts by mass of the total amount of the copolymer and an additional polymer that is added when needed.

The antioxidant has an effect, by itself, to prevent oxidative degradation of a resin caused in the presence of oxygen. Examples of the antioxidant can include phosphorus antioxidants, hindered phenol antioxidants, thioether antioxidants, and the like. The antioxidants may be used alone or in combination of two or more. Among these, from the viewpoint of the effect to prevent degradation of optical properties attributed to discoloration, phosphorus antioxidants and hindered phenol antioxidants are preferable, and a combined use of a phosphorus antioxidant and a hindered phenol antioxidant is more preferable.

When a phosphorus antioxidant and a hindered phenol antioxidant are used in combination, the proportion between these antioxidants is not particularly limited. However, the mass ratio of phosphorus antioxidant to hindered phenol antioxidant is preferably from 1/5 to 2/1, more preferably from 1/2 to 1/1.

Examples of the phosphorus antioxidant can include 2,2-methylenebis(4,6-di-t-butylphenyl)octyl phosphite (manufactured by ADEKA Corporation; trade name, ADK STAB HP-10), tris(2,4-di-t-butylphenyl)phosphite (manufactured by BASF; trade name, IRGAFOS 168), 3,9-bis(2,6-di-t-butyl-4-methylphenoxy)-2,4,8,10-tet raoxa-3,9-diphosphaspiro[5.5]undecane (manufactured by ADEKA Corporation; trade name, ADK STAB PEP-36), and the like.

Examples of the hindered phenol antioxidant can include pentaerythrityl-tetrakis[3-(3,5-di-t-butyl-4-hydroxyphenyl) propionate] (manufactured by BASF; trade name, IRGANOX 1010), octadecyl-3-(3,5-di-t-butyl-4-hydroxyphenyl)propionate (manufactured by BASF; trade name, IRGANOX 1076), and the like.

The thermal degradation inhibitor can trap polymer radicals that are generated at high heat in the practical absence of oxygen and can consequently prevent thermal degradation of the copolymer.

Examples of the thermal degradation inhibitor can include 2-t-butyl-6-(3'-t-butyl-5'-methyl-hydroxybenzyl)-4-methylphenyl acrylate (manufactured by Sumitomo Chemical Company, Limited; trade name, SUMILIZER GM), 2,4-di-t-amyl-6-(3',5'-di-t-amyl-2'-hydroxy-α-methylbenzyl)phenyl acrylate (manufactured by Sumitomo Chemical Company, Limited; trade name, SUMILIZER GS), and the like.

The ultraviolet absorber is a compound capable of absorbing ultraviolet light, and its primary function is regarded as converting light energy into thermal energy.

Examples of the ultraviolet absorber can include benzophenones, benzotriazoles, triazines, benzoates, salicylates, cyanoacrylates, oxalic anilides, malonic acid esters, formamidines, and the like. Preferable among these are benzotriazoles, triazines, or ultraviolet absorbers having a maximum molar absorption coefficient, $\varepsilon_{max}$, at a wavelength of 380 nm to 450 nm of not more than 100 $dm^3$ $mol^{-1}$ $cm^{-1}$.

The benzotriazoles effectively inhibit optical property degradation such as discoloration or the like attributed to ultraviolet exposure and therefore are preferably used as the ultraviolet absorber when a film of the present invention is used in optical applications. As preferable benzotriazoles, mentioned can be 2-(2H-benzotriazol-2-yl)-4-(1,1,3,3-tetramethylbutyl) phenol (manufactured by BASF; trade name, TINUVIN 329), 2-(2H-benzotriazol-2-yl)-4,6-bis(1-methyl-1-phenylethyl)phenol (manufactured by BASF; trade name, TINUVIN 234), 2,2'-methylenebis[6-(2H-benzotriazol-2-yl)-4-t-octylphenol (manufactured by ADEKA Corporation; LA-31), or the like.

The ultraviolet absorbers having a maximum molar absorption coefficient, $\varepsilon_{max}$, at a wavelength of 380 nm to 450 nm of not more than 1200 dm$^3$ mol$^{-1}$cm$^{-1}$ can inhibit discoloration of the resulting film. Examples of these ultraviolet absorbers can include 2-ethyl-2'-ethoxy-oxalic anilide (manufactured by Clariant (Japan) K.K.; trade name, Sanduvor VSU) and the like.

Among the ultraviolet absorbers described above, the benzotriazoles are preferably used from the viewpoint of preventing resin degradation due to ultraviolet exposure.

For efficient absorption at a wavelength near 380 nm, triazine ultraviolet absorbers are preferably used. Examples of the triazine ultraviolet absorbers can include 2,4,6-tris(2-hydroxy-4-hexyloxy-3-methylphenyl)-1,3,5-triazine (manufactured by ADEKA Corporation; LA-F70) and the like.

The maximum molar absorption coefficient, $\varepsilon_{max}$, of the ultraviolet absorber is determined as follows. To 1 L of cyclohexane, 10.00 mg of the ultraviolet absorber is added and dissolved until no undissolved matter is visually observed. The resulting solution is poured into a quartz glass cell of 1 cm×1 cm×3 cm and the absorbance at a wavelength of 380 nm to 450 nm for an optical path length of 1 cm is measured with a U-3410 spectrophotometer manufactured by Hitachi, Ltd. From the molecular weight ($M_{UV}$) of the ultraviolet absorber and the measured maximum absorbance ($A_{max}$), the maximum molar absorption coefficient, $\varepsilon_{max}$, is calculated by the following formula.

$$\varepsilon_{max}=[A_{max}/(10\times10^{-3})]\times M_{UV}$$

Regarding the light stabilizer, the primary function thereof is regarded as trapping radicals generated by light oxidation. Preferable examples of the light stabilizer can include hindered amines such as compounds having 2,2,6,6-tetraalkylpiperidine skeleton, and the like.

Examples of the lubricant can include stearic acid, behenic acid, stearamide acid, methylenebisstearamide, hydroxystearate triglyceride, paraffin wax, ketone wax, octyl alcohol, hardened oil, and the like.

The mold release agent is a compound that has a function of facilitating release of a formed article from a mold. Examples of the mold release agent can include higher alcohols such as cetyl alcohol, stearyl alcohol or the like; glycerol higher fatty acid esters such as stearic acid monoglyceride, stearic acid diglyceride or the like; and the like. As the mold release agent, in the present invention, a combination of the higher alcohol and the glycerol fatty acid monoester is preferably used. When the higher alcohol and the glycerol fatty acid monoester are used in combination, the proportion between these is not particularly limited. However, the mass ratio of higher alcohol to glycerol fatty acid monoester is preferably from 2.5/1 to 3.5/1, more preferably from 2.8/1 to 3.2/1.

The polymer processing aid is a compound that effectively achieves accurate thickness and gives a thin film in copolymer formation. The polymer processing aid is usually a polymer particle having a particle diameter of 0.05 to 0.5 µm that can be produced by the emulsion polymerization method.

The polymer particle may be a monolayer particle composed of a polymer having a single composition ratio and a single limiting viscosity, or may be a multilayer particle composed of two or more polymers having different composition ratios or different limiting viscosities. Among these, preferable examples can include particles having a two-layer structure where the inner layer is a polymer with a limiting viscosity of less than 5 dl/g and the outer layer is a polymer layer with a limiting viscosity of not less than 5 dl/g. The limiting viscosity of the polymer processing aid as a whole is preferably 3 dl/g to 6 dl/g.

Examples of the impact resistance modifier can include core-shell modifiers comprising acrylic rubber or diene rubber as a core layer component; modifiers containing a plurality of rubber particles; and the like.

Preferable as the organic coloring agent is a compound that has a function of converting ultraviolet light, which is thought to be harmful to the copolymer, into visible light.

Examples of the light dispersing agent or the delustering agent can include glass microparticles, polysiloxane crosslinked microparticles, crosslinked polymer microparticles, talc, calcium carbonate, barium sulfate, and the like.

Examples of the fluorescent substance can include fluorescent pigments, fluorescent dyes, fluorescent white dyes, fluorescent brighteners, fluorescent bleaching agents, and the like.

Examples of the antistatic agent can include stearamidepropyldimethyl-µ-hydroxyethylammonium nitrate and the like.

Examples of the flame retardant can include organic-halogen flame retardants such as tetrabromobisphenol A, decabromodiphenyloxide, brominated polycarbonate or the like; halogen-free flame retardants such as antimony oxide, aluminum hydroxide, zinc borate, phosphoric acid, o-phosphoric anhydride, tricresyl phosphate, and hydroxymethyldiethyl phosphonate, and a reaction product of biphenyl-4,4'-diol/phenol/phosphoryl trichloride predominantly composed of 4,4'-bis(diphenylphosphoryl)-1,1'-biphenyl (for example, FP800 manufactured by ADEKA Corporation); and the like.

Examples of the plasticizer can include phosphoric acid triester plasticizers such as tricresyl phosphate, trixylenyl phosphate, triphenyl phosphate, triethylphenyl phosphate, diphenylcresyl phosphate, monophenyldicresyl phosphate, diphenylmonoxylenyl phosphate, monophenyldixylenyl phosphate, tributyl phosphate, triethyl phosphate or the like; phthalic acid ester plasticizers such as dimethyl phthalate, dibutyl phthalate, diheptyl phthalate, di-n-octyl phthalate, di-2-ethylhexyl phthalate, diisononyl phthalate, octyldecyl phthalate, butylbenzyl phthalate or the like; fatty acid monobasic acid ester plasticizers such as butyl oleate, glycerol monooleic acid esters or the like; dihydric alcohol ester plasticizers; oxyacid ester plasticizers; and the like.

Examples of the plasticizer can include squalane (also known as 2,6,10,15,19,23-hexamethyltetracosane, $C_{30}14_{62}$, Mw=422.8), liquid paraffin (white oil; JIS-K-2231-defined oils such as ISO VG10, ISO VG15, ISO VG32, ISO VG68, ISO VG100, ISO VG8, ISO VG21 or the like), polyisobutene, hydrogenated polybutadiene, hydrogenated polyisoprene, and the like. Among these, squalane, liquid paraffin, and polyisobutene are preferable.

Examples of the inorganic filler can include calcium carbonate, talc, carbon black, titanium oxide, silica, clay, barium sulfate, magnesium carbonate, and the like.

Examples of the fiber can include glass fiber, carbon fiber, and the like.

The formed article of the present invention comprises the copolymer of the present invention, preferably not less than 70% by mass of the copolymer of the present invention. The method for producing the formed article of the present invention is not particularly limited. For example, the copolymer of the present invention can be obtained by a melt forming process such as T-die method (for example, lamination method, coextrusion method or the like), inflation method (for example, coextrusion method or the like), compression forming method, blow forming method, calendering method, vacuum forming method, injection molding method (for example, insertion method, two-color method, pressing method, core-back method, sandwich method or the like) or a solution casting process. Alternatively, the formed article of the present invention can be obtained by a reaction forming process, such as the cell-cast polymerization method, in which the monomer mixture is subjected to both polymerization reaction and forming at the same time. Among these forming methods, the T-die method, the inflation method, the injection molding method, and the cell-cast polymerization method are preferable in terms of high productivity and low cost. There is no limitation on the thickness of the formed article of the present invention. For example, a formed article having a thickness of not less than 2 mm can be obtained by any of the methods described above.

When obtaining the formed article of the present invention, the forming process may be conducted multiple times. For example, the copolymer of the present invention can be subjected to a forming process and then the resulting formed article in the pellet form is subjected to another forming process to consequently obtain a formed article in a desired form.

When producing the formed article of the present invention, an additional polymer may be mixed with and formed together with the copolymer of the present invention provided that the effects of the present invention are not impaired. Examples of the additional polymer can include polyolefin resins such as polyethylene, polypropylene, polybutene-1, poly-4-methylpentene-1, polynorbonene or the like; ethylene ionomers; styrene resins such as polystyrene, styrene-maleic anhydride copolymer, high impact polystyrene, AS resin, ABS resin, AES resin, AAS resin, ACS resin, MBS resin or the like; methyl methacrylate polymer. methyl methacrylate-styrene copolymer; polyester resins such as polyethylene terephthalate, polybutylene terephthalate or the like; polyamides such as nylon 6, nylon 66, polyamide elastomers or the like; polycarbonate, polyvinyl chloride, polyvinylidene chloride, polyvinyl alcohol, ethylene-vinyl alcohol copolymer, polyacetal, polyvinylidene fluoride, polyurethane, modified polyphenylene ether, polyphenylene sulfide, modified silicone resins; acrylic rubber, silicone rubber; styrene thermoplastic elastomers such as SEPS, SEBS, SIS or the like; olefin rubbers such as IR, EPR, EPDM; and the like.

When producing the formed article of the present invention, various additives may be added, when needed, provided that the effects of the present invention are not impaired.

The formed article of the present invention may be used in laminate production. The resulting laminate may be composed solely of the formed articles of the present invention or may be composed of the formed article of the present invention and an article made of another material.

The production method of the lamination is not particularly limited. Examples of the method can include simultaneous extrusion of two or more polymers (coextrusion method); fusion bonding of two or more formed articles to each other using a means such as heat, ultrasonic wave, high-frequency wave or the like (fusion bonding method); adhesive bonding of two or more formed articles to each other with the use of, for example, an ultraviolet curable adhesive, a heat curable adhesive, a radiation curable adhesive or the like (adhesive bonding method); forming by pouring a molten polymer into a mold lined with a sheet or a film (insert molding method); deposition of another material by chemical vapor deposition or physical vapor deposition (deposition method); film formation by applying a coating composition comprising another material (a coating method); and the like. In the fusion bonding method or in the adhesive bonding method, the surface to undergo fusion or adhesion may be treated with a known primer or subjected to a treatment such as corona discharge treatment, plasma treatment or the like prior to fusion or adhesion.

That other material described above to be laminated with the formed article of the present invention is not particularly limited and can be selected appropriately in accordance with the application of the resulting laminate. When the laminate is made into an optical part, non-limiting examples of that other material can include a hard coat material, an anti-reflective material, a liquid crystal, a cycloolefin ring-opened polymer or a hydrogenated product thereof, a cycloolefin addition polymer, an aliphatic olefin resin, an acrylic polymer, a polycarbonate resin, a liquid crystal polymer, soda glass, quartz glass, and the like.

The surface of the formed article of the present invention or the surface of the laminate comprising the formed article of the present invention can receive printing treatment or can be shaped by cutting or embossing, for example. When a printed or shaped surface is subjected to lamination together with the another material by a method such as the insert molding method, letters, patterns, projections and depressions, and the like that have been provided by printing or shaping are left interposed between the formed article of the present invention and the other material. Because of the excellent transparency of the formed article of the present invention, the letters, the patterns, the projections and depressions, and the like are clearly visible.

The formed article of the present invention is preferably in the film or sheet form. Typically, the film refers to a flat formed article having a thickness of not less than 0.005 mm and not more than 0.25 mm, and the sheet refers to a flat formed article having a thickness of more than 0.25 mm.

The thickness of the formed article of the present invention is preferably not less than 0.1 mm and less than 100 mm, more preferably not less than 0.5 mm and less than 50 mm, further preferably not less than 0.8 mm and less than 30 mm, most preferably not less than 1 mm and less than 10 mm.

The copolymer and the formed article of the present invention are excellent in transparency, flame resistance, and heat resistance and can therefore be used in various fields including optical field, food field, medical care field, automobile field, field of electricity and electronics and the like. For example, the copolymer and the formed article of the present invention are useful as various optical components (viewfinders, filters, prisms, Fresnel lenses, and the like) for optical devices (microscopes, binoculars, cameras, and the like), various optical components (light guide films or sheets, retardation films or sheets, polarizing films or sheets, protective films or sheets for polarizing plates, light dispersing films or sheets, prism films or sheets, reflective films or sheets, anti-reflective films or sheets, viewing-angle-widening films or sheets, anti-glare films or sheets, brightness enhancement films or sheets, front plates, and the like) for display devices (televisions, touch panels, personal computers, mobile units, and the like), and optical components such as optical switches, optical connectors and the like; lighting fixture components such as lighting covers; and the like. The copolymer and the formed article of the present invention are also useful in outdoor applications, for example, for housing parts (roofs, windows, gutters, walls, and the like), retroreflective films or sheets, agricultural films or sheets, signboards (gas station signs, display boards, shop signs, and the like), decorative components, noise barriers, and the like. The copolymer and the formed article of the present invention are also useful for signboards in indoor applications inside stations, buildings, and residences, and construction materials, for example.

The present invention is described more specifically referring to examples and comparative examples. The present invention is, however, not limited to these examples. The present invention includes all the aspects in which the above-mentioned technical characteristics are combined as needed, such as measurement values of properties, configurations, production processes, and applications.

Measurement of physical properties and the like of the copolymer and the formed article are carried out by the following methods.

[Constitution Analysis of Structural Units of Copolymer]
Apparatus: a nuclear magnetic resonance apparatus (ULTRA SHIELD 400 PLUS manufactured by Bruker)
Solvent: deuterated chloroform
Nucleus measured: $^1H$
Measurement temperature: room temperature
Cumulated number: 64

[Weight Average Molecular Weight and Molecular Weight Distribution]
Based on measurement by gel permeation chromatography (GPC), the weight average molecular weight and the molecular weight distribution of the copolymer in terms of polystyrene were determined. The GPC device used was HLC-8320 (product number) manufactured by Tosoh Corporation. The columns used were two TSKgel SuperMultipore HZM-M columns and one SuperHZ4000 column manufactured by Tosoh Corporation, connected in series.
Eluting agent: tetrahydrofuran
Flow rate of eluting agent: 0.35 ml/minute
Column temperature: 40° C.
Calibration curve: drawn by connecting 10 points plotted for standard polystyrene

[Total Light Transmittance]
A resin pellet was subjected to heat press formation at 230° C. and, as a result, a sheet-like formed article having a thickness of 3.2 mm was obtained. In accordance with JIS K7361-1, the total light transmittance of the formed article at an optical path length of 3.2 mm was measured with HR-100 (product number) manufactured by Murakami Color Research Laboratory.

[Haze]
A test piece having a thickness of 3.2 mm was subjected to measurement of haze (H) at an optical path length of 3.2 mm in accordance with JIS K7136 with a haze meter (HM-150 manufactured by Murakami Color Research Laboratory).

[Yellow Index]
A test piece having a thickness of 3.2 mm was subjected to measurement in accordance with JIS 28722 with a colorimeter ZE-2000 manufactured by Nippon Denshoku Industries Co., Ltd. at an optical path length of 3.2 mm, and a yellow index (YI) was calculated in accordance with JIS K7373 using the measured data.

[Glass Transition Temperature]
In accordance with JIS K7121, a DSC curve was obtained by differential scanning calorimetry under conditions where the temperature of a resin pellet was raised to reach 230° C., then cooled to room temperature, and raised again from room temperature to 230° C. at 10° C./minute. From the DSC curve obtained while the temperature was being raised the second time, the midpoint glass transition temperature was determined, for use as the glass transition temperature of the present invention. The device used in the measurement was DSC-50 (product number) manufactured by Shimadzu Corporation.

[Water Absorption]
A test piece having a length of 50 mm, a width of 50 mm, and a thickness of 3.2 mm was dried for three days in an environment at 50° C. and 667 Pa (5 mmHg) to obtain an absolute dry test piece. The mass of the absolute dry test piece, W0, was measured. Subsequently, the absolute dry test piece was immersed in water at a temperature of 23° C. and left for two months. Taken out of the water, the test piece was subjected to measurement for the mass, W1. The saturated water absorption (%) was calculated by the following formula.

Saturated water absorption=$\{(W1-W0)/W0\} \times 100$

[Flame Resistance]
Flame resistance evaluation was conducted in accordance with JIS K6911 (1995) 5.24 flame resistance A method. The resin pellet was formed into a test piece having a length of about 127 mm and a width and a thickness of 12.7±0.5 mm each. The test piece was marked with reference lines at positions 25 mm and 100 mm away from one end (the free end). A burner was placed on a platform that was inclined in an angle of 30 degrees, so that the burner was maintained at an angle of 30 degrees against the vertical direction. Inside a room with no perceivable air flow, one end of the test piece was supported on a lab stand equipped with a clamp in such a manner that the longitudinal sides of the test piece were held horizontally, the sides of the test piece in the width direction were held at an angle of 45 degrees against the horizontal direction, and the lower end of the test piece was held at the height where the tip of the blue flame of the burner reached. The lower free end of the test piece was brought into contact for 30 seconds with the tip of the blue flame of the burner that was being maintained at an angle of 30 degrees. When the test piece was removed from contact with the flame, a stopwatch was started simultaneously. The test piece was kept 450 mm or a greater distance away from the flame. The stopwatch was stopped when the test piece stopped burning, and the time measured in seconds was defined as a burning time. When the test piece did not stop burning in 180 seconds, the test piece was evaluated as "combustible". After the test piece stopped burning, the burned length of the test piece was measured in millimeters (mm) from the lower end, defined as a burned distance. When the burned distance was not more than 25 mm, the test piece was evaluated as "incombustible". When the burned distance was more than 25 mm and not more than 100 mm, the test piece was evaluated as "self-extinguishing".

For use as the phosphonate monomer (1), diethyl methacryloyloxymethyl phosphonate (see Formula (A), hereinafter called as "DEMMPO") and diethyl 2-methacryloyloxyethyl phosphonate (see Formula (B), hereinafter called as "DEMEPO") were prepared. DEMMPO was synthesized by a method described in Non-patent Document 1. DEMEPO was synthesized by a method described in Non-patent Document 3.

[Chem. 4]

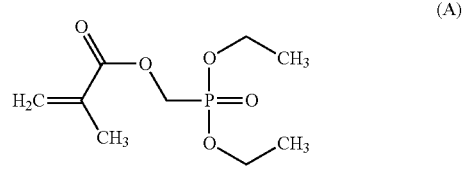

(A)

-continued

[Chem. 5]

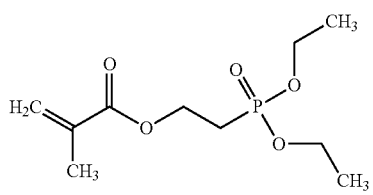
(B)

For use as the radical polymerizable monomer (2), methacrylic acid (hereinafter, called as "MAA"), t-butyl methacrylate (hereinafter, called as "tBMA"), 8-tricyclo[5.2.1.0$^{2,6}$]decanyl methacrylate (see Formula (C), hereinafter called as "TCDMA"), and 2-isobornyl methacrylate (see Formula (D), hereinafter called as "IBMA") were prepared.

[Chem. 6]

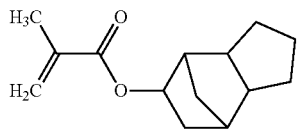
(C)

[Chem. 7]

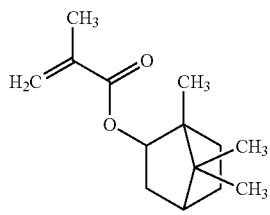
(D)

For use as a radical polymerizable monomer (3), methyl methacrylate (hereinafter, called as "MMA") was prepared.

For use as the radical polymerizable monomer (4), methyl acrylate (hereinafter, called as "MA"), styrene (hereinafter, called as "St"), and 5-methyl-3-methylidenedihydrofuran-2(3H)-one (see Formula (E), hereinafter called as "MMBL") were prepared. MMBL was synthesized by a method described in Non-patent Document 5.

[Chem. 8]

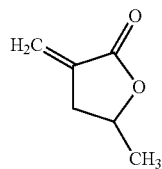
(E)

Example 1

By mixing 15 parts by mass of DEMMPO, 15 parts by mass of TCDMA, 6 parts by mass of MAA, 62 parts by mass of MMA, and 2 parts by mass of MA, a monomer mixture was obtained. To the monomer mixture, 0.1 part by mass of a polymerization initiator (2,2'-azobis(2-methylpropionitrile), with a hydrogen abstraction ability of 1%, a 1-hour half-life temperature of 83° C.) was added for dissolution to obtain a raw material solution.

The resulting raw material solution was poured into a glass cell composed of two pieces of water-repellent glass plates (in the shape of square having a thickness of 10 mm and measuring 30 cm per side) and a gasket made of vinyl chloride resin, followed by deaeration at 10 mmHg for three minutes. The glass cell was maintained at 70° C. for two hours and then at 120° C. for another two hours for polymerization of the monomer mixture. Subsequently, the glass plates were removed, and a sheet-like formed article having a thickness of 3.2 mm was obtained. From the resulting sheet-like formed article, a test piece having a length of 127 mm, a width of 13 mm, and a thickness of 3.2 mm was cut out, which was used for evaluation of flame resistance, transparency, and water absorption.

The resulting sheet-like formed article, which was made of a polymer having a very high molecular weight, did not dissolve in solvent but just swelled. Because of this phenomenon, it was impossible to conduct GPC for molecular weight measurement. The weight average molecular weight of the sheet-like formed article is estimated at not less than 1 million g/mol. The content (mol %) of the structural unit derived from DEMMPO, which is the phosphonate monomer (1), and the content (% by mass) of phosphorus atoms in the swollen sheet-like formed article were measured by $^1$H-NMR analysis. The results are shown in Table 1.

Examples 2 and 5 to 11 and Comparative Examples 1 to 6

A sheet-like formed article having a thickness of 3.2 mm was obtained in the same manner as in Example 1 except that the recipe shown in Table 1 or 2 was adopted. The resulting test piece was evaluated in the same manner as in Example 1. The results are shown in Table 1 or 2.

Example 3

By mixing 10 parts by mass of DEMMPO, 15 parts by mass of TCDMA, 6 parts by mass of MAA, and 69 parts by mass of MMA, a monomer mixture was obtained. To the monomer mixture, 0.1 part by mass of a polymerization initiator (2,2'-azobis(2-methylpropionitrile), with a hydrogen abstraction ability of 1%, a 1-hour half-life temperature of 83° C.) and 0.1 part by mass of a chain transfer agent (n-octyl mercaptan) were added for dissolution. Thus, a raw material solution was obtained.

By mixing 100 parts by mass of ion-exchanged water, 0.03 part by mass of sodium sulfate, and 0.46 part by mass of a suspending or dispersing agent together, a mixed liquid was obtained.

In a pressure-resistant polymerization reactor, 420 parts by mass of the mixed liquid and 210 parts by mass of the raw material solution were charged, followed by raising the temperature to 70° C. to initiate polymerization reaction in a nitrogen atmosphere with stirring. Three hours after initiation of the polymerization reaction, the temperature was raised to 90° C. Stirring was conducted for one hour to obtain a dispersion containing a bead-like fine particle dispersed therein.

After filtration of the resulting dispersion, the fine particle was rinsed with ion-exchanged water and dried under reduced pressure at 80° C. and 100 Pa for four hours to obtain a bead-like copolymer.

The resulting copolymer was fed into a twin screw extruder that was maintained at 230° C. Volatile components comprising an unreacted monomer and the like were separated and removed. Then, the resin component was extruded into a strand. The resulting strand was cut with a pelletizer, and a pellet-like formed article was obtained.

The resulting pellet-like formed article was subjected to measurement of glass transition temperature. The pellet-like formed article was also subjected to heat press formation at 230° C. into a sheet-like formed article having a thickness of 3.2 mm. From the sheet-like formed article, a test piece having a length of 127 mm, a width of 13 mm, and a thickness of 3.2 mm was cut out, which was used for evaluation of flame resistance, transparency, and water absorption. The results are shown in Table 1.

Example 4

A pellet-like formed article was obtained in the same manner as in Example 3 except that the recipe shown in Table 1 was adopted. The resulting pellet-like formed article was subjected to measurement of various physical properties and also to test piece evaluation in the same manner as in Example 1. The results are shown in Table 1. The results are shown in Table 1.

TABLE 1

| | | Example | | | | | | | |
|---|---|---|---|---|---|---|---|---|---|
| | | 1 | 2 | 3 | 4 | 5 | 6 | 7 | 8 |
| monomer proportion in monomer mixture [mass %] | | | | | | | | | |
| monomer (1) | DEMMPO | 15 | 10 | 10 | | 10 | 10 | 10 | 10 |
| | DEMEPO | | | | 10 | | | | |
| monomer (2) | TCDMA | 15 | 15 | 15 | 15 | 30 | | | |
| | IBMA | | | | | | | 15 | |
| | tBMA | | | | | | | | 12 |
| | MAA | 6 | 6 | 6 | 6 | | 12 | 6 | 6 |
| monomer (3) | MMA | 62 | 67 | 69 | 69 | 58 | 76 | 69 | 72 |
| monomer (4) | MA | 2 | 2 | | | 2 | 2 | | |
| | MMBL | | | | | | | | |
| | St | | | | | | | | |
| structural unit proportion in copolymer [mass %] | | | | | | | | | |
| structural unit (I) | DEMMPO | 14 | 10 | 10 | | 10 | 10 | 10 | 10 |
| | DEMEPO | | | | 10 | | | | |
| structural unit (II) | TCDMA | 15 | 15 | 15 | 15 | 29 | | | |
| | IBMA | | | | | | | 15 | |
| | tBMA | | | | | | | | 12 |
| | MAA | 6 | 6 | 6 | 6 | | 12 | 6 | 6 |
| structural unit (III) | MMA | 63 | 67 | 69 | 69 | 59 | 76 | 69 | 72 |
| structural unit (IV) | MA | 2 | 2 | | | 2 | 2 | | |
| | MMBL | | | | | | | | |
| | St | | | | | | | | |
| physical prpoerties of copolymer | | | | | | | | | |
| weight average molecular weight [×10³ g/mol] | | >1000 | >1000 | 108.6 | 112.0 | >1000 | >1000 | >1000 | >1000 |
| molecular weight distribution | | | | 1.9 | 1.8 | | | | |
| content of structural unit (I) [mol %] | | 7.48 | 4.85 | 4.87 | 4.61 | 5.38 | 4.39 | 4.87 | 4.62 |
| content of phosphorus atom [mass %] | | 1.97 | 1.31 | 1.31 | 1.24 | 1.31 | 1.31 | 1.31 | 1.31 |
| physicalities of formed article | | | | | | | | | |
| total light transmittance [%] | | 91 | 91 | 91 | 91 | 91 | 91 | 91 | 91 |
| H [%] | | 0.4 | 0.3 | 0.3 | 0.3 | 0.3 | 0.3 | 0.3 | 0.3 |
| YI | | 1.9 | 1.5 | 1.5 | 1.4 | 1.6 | 1.4 | 1.5 | 1.4 |
| glass transition temperature [° C.] | | 121 | 123 | 127 | 126 | 113 | 125 | 125 | 120 |
| water absorption [%] | | 3.9 | 3.6 | 3.6 | 3.6 | 2.3 | 5.2 | 3.5 | 3.9 |
| burning time [second] | | 16 | 25 | 23 | 46 | 42 | 14 | 41 | 22 |
| burned distance [mm] | | 2 | 3 | 3 | 5 | 5 | 2 | 4 | 3 |
| flame resistance | | incombustible | incombustible | incombustible | incombustible | incombustible | incombustible | incombustible | incombustible |

TABLE 2

| | | | | | Comparative Example | | | | |
|---|---|---|---|---|---|---|---|---|---|
| | | 9 | 10 | 11 | 1 | 2 | 3 | 4 | 5 |
| monomer proportion in monomer mixture [mass %] | | | | | | | | | |
| monomer (1) | DEMMPO | 10 | 10 | 10 | | 5 | 30 | 10 | 20 |
| | DEMEPO | | | | | | | | |

TABLE 2-continued

|  |  | 9 | 10 | 11 | Comparative Example 1 | 2 | 3 | 4 | 5 |
|---|---|---|---|---|---|---|---|---|---|
| monomer (2) | TCDMA | 15 | 15 |  |  | 15 | 15 |  |  |
|  | IBMA |  |  |  |  |  |  |  |  |
|  | tBMA |  |  |  |  |  |  |  |  |
|  | MAA | 6 | 6 | 8 |  | 6 | 6 |  |  |
| monomer (3) | MMA | 59 | 39 | 82 | 100 | 72 | 47 | 90 | 78 |
| monomer (4) | MA |  |  |  |  | 2 | 2 |  | 2 |
|  | MMBL | 10 |  |  |  |  |  |  |  |
|  | St |  | 30 |  |  |  |  |  |  |
| structural unit proportion in copolymer [mass %] |  |  |  |  |  |  |  |  |  |
| structural unit (I) | DEMMPO | 10 | 10 | 10 |  | 5 | 30 | 10 | 20 |
|  | DEMEPO |  |  |  |  |  |  |  |  |
| structural unit (II) | TCDMA | 15 | 15 |  |  | 15 | 15 |  |  |
|  | IBMA |  |  |  |  |  |  |  |  |
|  | tBMA |  |  |  |  |  |  |  |  |
|  | MAA | 6 | 6 | 8 |  | 6 | 6 |  |  |
| structural unit (III) | MMA | 59 | 39 | 82 | 100 | 72 | 47 | 90 | 78 |
| structural unit (IV) | MA |  |  |  |  | 2 | 2 |  | 2 |
|  | MMBL | 10 |  |  |  |  |  |  |  |
|  | St |  | 30 |  |  |  |  |  |  |
| physical prpoerties of copolymer |  |  |  |  |  |  |  |  |  |
| weight average molecular weight [×10³ g/mol] |  | >1000 | >1000 | >1000 | >1000 | >1000 | >1000 | >1000 | >1000 |
| molecular weight distribution |  |  |  |  |  |  |  |  |  |
| content of structural unit (1) [mol %] |  | 4.93 | 4.93 | 4.44 | 0.00 | 2.35 | 16.77 | 4.50 | 9.55 |
| content of phosphorus atom [mass %] |  | 1.31 | 1.31 | 1.31 | 0.00 | 0.66 | 3.93 | 1.31 | 2.48 |
| physicalities of formed article |  |  |  |  |  |  |  |  |  |
| total light transmittance [%] |  | 91 | 88 | 91 | 91 | 91 | 90 | 91 | 91 |
| H [%] |  | 0.3 | 0.5 | 0.3 | 0.3 | 0.3 | 0.3 | 0.3 | 0.3 |
| YI |  | 1.6 | 1.7 | 1.4 | 1.1 | 1.3 | 3.0 | 1.4 | 2.1 |
| glass transition temperature [° C.] |  | 127 | 115 | 120 | 119 | 125 | 107 | 109 | 102 |
| water absorption [%} |  | 3.2 | 2.5 | 4 | 2.0 | 3.4 | 4.7 | 2.9 | 3.6 |
| burning time [second] |  | 22 | 29 | 154 | >180 | >180 | 15 | >180 | >180 |
| burned distance [mm] |  | 3 | 4 | 28 | — | — | 2 | — | — |
| flame resistance |  | incombustible | incombustible | Self-extinguishing | combustible | combustible | incombustible | combustible | combustible |

As described above, the copolymer of the present invention has excellent transparency, excellent flame resistance, and a high glass transition temperature.

The invention claimed is:

1. A copolymer comprising:
a structural unit (I) derived from a phosphonate monomer represented by Formula (1);
a structural unit (II) derived from at least one radical polymerizable monomer (2) selected from the group consisting of methacrylic acid, acrylic acid, a radical polymerizable monomer represented by Formula (2a), and a radical polymerizable monomer represented by Formula (2b); and
a structural unit (III) derived from methyl methacrylate;
a content of phosphorus atoms derived from the phosphonate monomer represented by Formula (1) being not less than 1.0% by mass and less than 2.0% by mass relative to a mass of the copolymer;

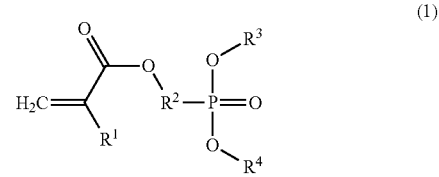

wherein in Formula (1), $R^1$ represents hydrogen atom or methyl group, $R^2$ represents an alkylene group having 1 to 4 of carbon atoms, and $R^3$ and $R^4$ each independently represent hydrogen atom or an alkyl group having 1 to 10 of carbon atoms,

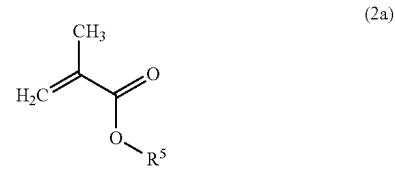

wherein in Formula (2a), $R^5$ represents a polycyclic aliphatic hydrocarbon group or an alkyl-substituted monocyclic aliphatic hydrocarbon group,

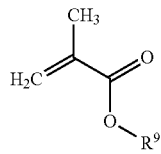

(2b)

wherein in Formula (2b), $R^9$ represents —$CH_2CHR^{10}R^{11}$; —$CHR^{10}$—$CHR^{11}R^{12}$, or —$CR^{10}R^{11}R^{13}$; $R^{10}$, $R^{11}$ and $R^{13}$ each independently represent an alkyl group having 1 to 3 of carbon atoms, and $R^{12}$ represents hydrogen atom or an alkyl group having 1 to 3 of carbon atoms; and wherein a content of the structural unit (II) is not less than 5% by mass and not more than 30% by mass relative to the mass of the copolymer.

2. The copolymer according to claim 1, wherein the structural unit (II) comprises at least a structural unit derived from methacrylic acid or acrylic acid, a total content of the structural unit derived from methacrylic acid or acrylic acid is 1 to 12% by mass relative to the mass of the copolymer.

3. The copolymer according to claim 1, wherein a content of the structural unit (III) is not less than 50% by mass and not more than 80% by mass relative to the mass of the copolymer.

4. The copolymer according to claim 1, wherein the structural unit (II) comprises at least a structural unit derived from the radical polymerizable monomer represented by Formula (2a), and $R^5$ in Formula (2a) is norbornyl group, isobornyl group, tricyclodecanyl group, dicyclopentadienyl group, adamantyl group, or 4-t-butylcyclohexyl group.

5. The copolymer according to claim 1, having a glass transition temperature of not less than 115° C.

6. The copolymer according to claim 1, having a weight average molecular weight of not less than 150 thousand.

7. The copolymer according to claim 1, wherein the phosphonate monomer is diethyl methacryloyloxymethyl phosphonate and/or diethyl 2-methacryloyloxyethyl phosphonate.

8. The copolymer according to claim 1, wherein the content of the structural unit (I) in the copolymer is not less than 3.6 mol % and less than 15 mol %.

9. The copolymer according to claim 1, further comprising a structural unit (IV), wherein the structural unit (IV) in the copolymer contains a structural unit (IV-1) derived from a polyfunctional polymerizable monomer.

10. The copolymer according to claim 9, wherein a content of the structural unit (IV) in the copolymer is not more than 15% by mass.

11. The copolymer according to claim 9, wherein a content of the structural unit (IV-1) in the copolymer is not less than 0.001% by mass and not more than 10% by mass.

12. The copolymer according to claim 9, wherein the polyfunctional polymerizable monomer is ethylene glycol di(meth)acrylate and/or diethylene glycol di(meth)acrylate.

13. The copolymer according to claim 1, further comprising a structural unit (IV), wherein the structural unit (IV) in the copolymer is derived from a methacrylic acid alkyl ester and/or an acrylic acid alkyl ester.

14. The copolymer according to claim 1, having a glass transition temperature of 110° C. to 180° C.

15. The copolymer according to claim 1, having a ratio of weight average molecular weight to number average molecular weight of 1.1 to 10.0.

16. The copolymer according to claim 1, wherein the content of phosphorus atoms derived from the phosphonate monomer represented by Formula (1) is not less than 1.20% by mass and not more than 1.98% by mass relative to a mass of the copolymer.

17. A formed article comprising the copolymer according to claim 1.

18. The formed article according to claim 17, having a thickness of not less than 2 mm.

19. The formed article according to claim 17, having a thickness of not less than 0.1 mm and less than 100 mm.

* * * * *